(No Model.)

W. KESLER.
TIRE SETTER.

No. 315,298. Patented Apr. 7, 1885.

WITNESSES:
Fred. G. Dieterich.
Wm. Bagger.

INVENTOR.
William Kesler.
by Louis Bagger & Co.
ATTORNEYS.

UNITED STATES PATENT OFFICE.

WILLIAM KESLER, OF EAST RINGGOLD, OHIO.

TIRE-SETTER.

SPECIFICATION forming part of Letters Patent No. 315,298, dated April 7, 1885.

Application filed February 24, 1885. (No model.)

*To all whom it may concern:*

Be it known that I, WILLIAM KESLER, a citizen of the United States, and a resident of East Ringgold, in the county of Pickaway and State of Ohio, have invented certain new and useful Improvements in Combined Revolving Wheel-Rack, Wheel-Press, and Tire-Cooler; and I do hereby declare that the following is a full, clear, and exact description of the invention, which will enable others skilled in the art to which it appertains to make and use the same, reference being had to the accompanying drawings, which form a part of this specification, and in which—

Figure 1:
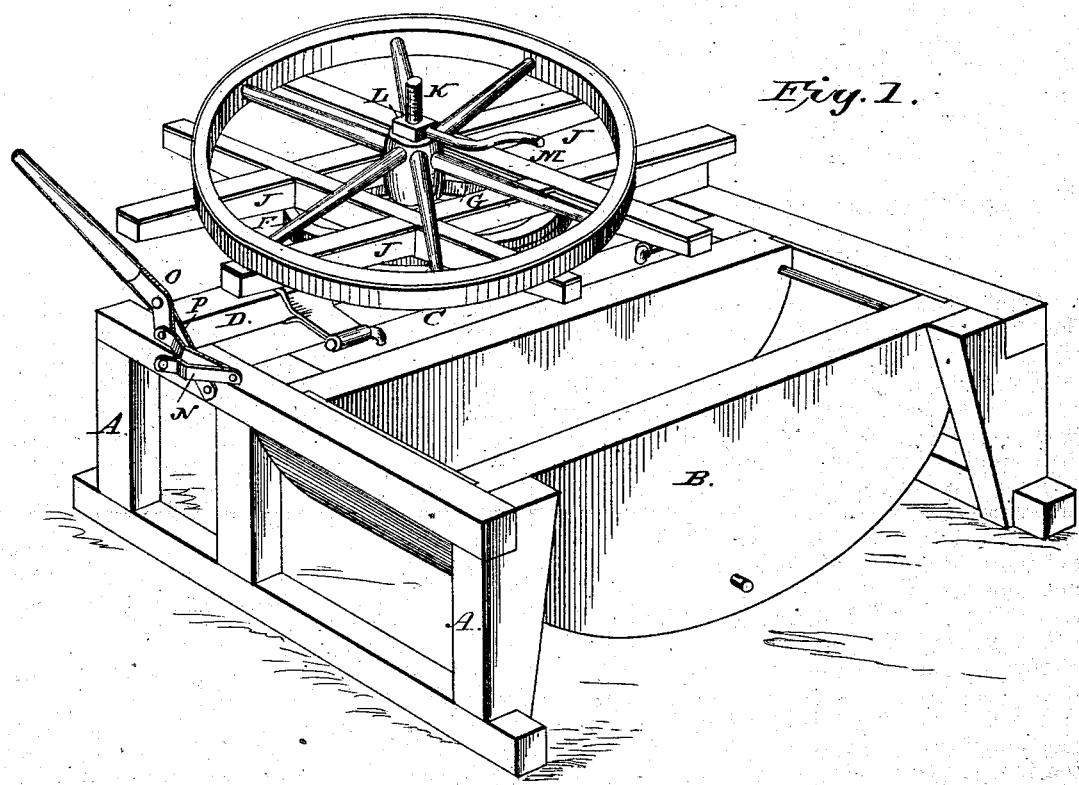
Figure 2:
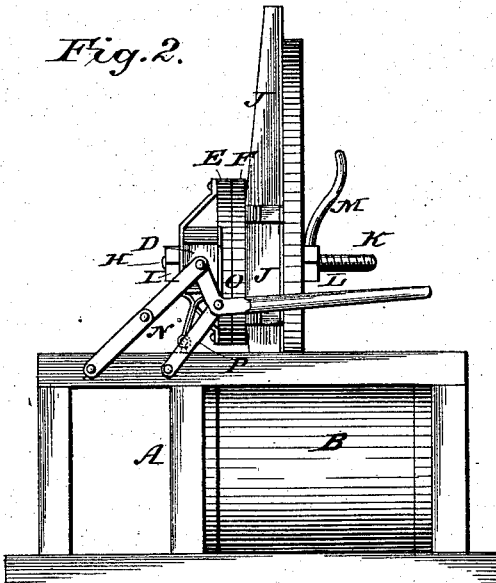
Figure 3:
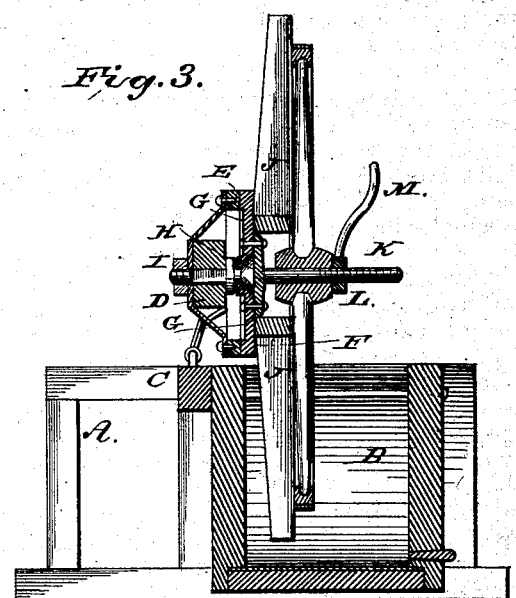

Figure 1 is a perspective view of my improved combined wheel-rack, wheel-press, and tire-cooler. Fig. 2 is an end view of the same, showing the frame carrying the wheel tilted into the tire-cooling tank; and Fig. 3 is a transverse sectional view.

The same letters refer to the same parts in all the figures.

This invention relates to an improved combined wheel-rack, wheel-press, and tire-cooler, comprising a revolving rack or frame, upon which a wheel may be supported while the tire is being fitted and applied, and a water-tank into which the said rack or frame carrying the wheel may be tilted for the purpose of cooling the tire; and it has for its object to provide a device of this class which shall possess superior advantages in point of simplicity, durability, and general efficiency.

With these ends in view, the invention consists in the improved construction and arrangement of parts, which will be hereinafter fully described, and particularly pointed out in the claim.

In the drawings hereto annexed, A designates a suitably-constructed frame, and which supports at one side a water-tank, B, approximately semi-cylindrical in shape, and constructed of wood or metal, or of wood and metal combined, in any suitable manner. The frame A has a longitudinal beam, C, adjoining the water-tank, and to which is hinged a beam, D, adapted to rest on top of the frame A, as shown in Fig. 1 of the drawings, and which may be swung or tilted up to the position shown in Fig. 2. To the upper side of the said beam D is secured a circular wheel or track, E, forming a bearing for another wheel, F, mounted thereon, and having radial braces G G, meeting at the center or hub, which is provided with a downwardly-extending countersunk and swiveled bolt, H, which passes through the beam D, and is secured by a nut, I, on the under side of the latter.

To the upper side of the wheel F is bolted or otherwise secured the wheel rest or frame J, which consists of four beams mortised together substantially as shown, and faced with metal on the upper side.

K is a bolt having a T-head, by which it is secured in any suitable manner to the upper side of the wheel F, and equipped with a tap or nut, L, having a handle, M. The ends of the beam D are connected with the end rails of the frame A by means of pivoted and jointed braces N N, and to one of the ends of said beam is pivoted the short end or arm of a bell-crank lever, O, which is fulcrumed at the upper end of a rod, P, which in turn is pivoted to the end rail of the frame. It will be seen that by means of this bell-crank lever the beam D, with its attachments, may be easily tilted to the upright position shown in Fig. 2, or back to the position shown in Fig. 1 of the drawings, as occasion may require.

From the foregoing description, taken in connection with the drawings hereto annexed, the operation and advantages of my invention will be readily understood. The wheel which is to be operated upon is placed upon the rack or frame J, with its hub fitted over the bolt K, upon which the tap L is then adjusted, thereby pressing the wheel firmly down upon the rest or frame, and holding it in position while it is being fitted with a tire. When the tire has been heated and placed in position, the rest or frame is tilted to the position shown in Fig. 2 of the drawings, thus immersing the rest and wheel partly in the water-tank, when, by revolving the frame or rest, the tire will be gradually cooled and shrunk upon the rim of the wheel.

This device is exceedingly simple in construction, inexpensive, and convenient for the purposes set forth. It is comparatively light and compact, and may be easily moved from place to place, as occasion for using it shall arise.

Having thus described my invention, I claim and desire to secure by Letters Patent of the United States—

The combination of the frame having a suitable water-tank, and provided with a longitudinal beam adjoining the latter, a beam hinged to the said longitudinal beam and adapted to rest upon the ends of the frame, and carrying a circular track, and a wheel-rest frame and attaching device mounted to revolve thereon, jointed braces connecting the ends of the frame with the ends of the hinged beam, and a bell-crank lever fulcrumed to a strap which is pivoted to one of the ends of the frame, and having its short arm connected pivotally with one end of the hinged beam, substantially as and for the purpose herein set forth.

In testimony that I claim the foregoing as my own I have hereunto affixed my signature in presence of two witnesses.

WILLIAM KESLER.

Witnesses:
J. LONGENBAUGH,
A. S. LONGENBAUGH.